US009721471B2

(12) United States Patent
Chen et al.

(10) Patent No.: US 9,721,471 B2
(45) Date of Patent: Aug. 1, 2017

(54) LEARNING LANES FROM RADAR DATA

(71) Applicant: HERE Global B.V., Veldhoven (NL)

(72) Inventors: Xin Chen, Evanston, IL (US); Di Ma, Chicago, IL (US); Xiang Ma, Chicago, IL (US); Roman Ostrovskiy, Prospect Heights, IL (US); Vladimir Zhukov, Chicago, IL (US); Xiaotao Zou, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 226 days.

(21) Appl. No.: 14/572,197

(22) Filed: Dec. 16, 2014

(65) Prior Publication Data

US 2016/0171893 A1 Jun. 16, 2016

(51) Int. Cl.
*G05D 1/02* (2006.01)
*G06F 17/10* (2006.01)
*G06G 7/78* (2006.01)
*G08G 1/16* (2006.01)
*G01S 15/93* (2006.01)
(Continued)

(52) U.S. Cl.
CPC ............ *G08G 1/167* (2013.01); *G01S 13/931* (2013.01); *G01S 15/931* (2013.01); *G01S 17/936* (2013.01); *G08G 1/0112* (2013.01); *G08G 1/0133* (2013.01); *G08G 1/0141* (2013.01); *G01S 2013/9353* (2013.01); *G01S 2013/9357* (2013.01); *G01S 2013/9364* (2013.01); *G01S 2013/9367* (2013.01); *G08G 1/165* (2013.01)

(58) Field of Classification Search
CPC ....... G01S 13/931; G08G 1/165; G08G 1/167
USPC ......................................................... 701/300
See application file for complete search history.

(56) References Cited

U.S. PATENT DOCUMENTS 6,385,539 B1 5/2002 Wilson et al.
6,556,916 B2 4/2003 Waite et al.
(Continued)

FOREIGN PATENT DOCUMENTS

CN 103809163 A 5/2014
DE 102010053964 A1 8/2011
(Continued)

OTHER PUBLICATIONS

Shengyan Zhou, Road Detection Using Support Vector Machine Based on Online Learning and Evaluation, Jan. 15, 2010.
(Continued)

*Primary Examiner* — Harry Oh
(74) *Attorney, Agent, or Firm* — Lempia Summerfield Katz LLC

(57) ABSTRACT

Systems, methods, and apparatuses are disclosed for determining lane information of a roadway segment from vehicle probe data. Probe data is received from radar sensors of vehicles at a road segment, where the probe data includes an identification of static objects and dynamic objects in proximity to the respective vehicles at the road segment, and geographic locations of the static objects and the dynamic objects. A reference point, such as a road boundary, at the road segment is determined from the identified static objects. Lateral distances between the identified dynamic objects and the reference point are calculated. A number of lanes at the road segment are ascertained from a distribution of the calculated distances of the identified dynamic objects from the reference point.

16 Claims, 10 Drawing Sheets

(51) Int. Cl.
 *G01S 17/93* (2006.01)
 *G01S 13/93* (2006.01)
 *G08G 1/01* (2006.01)

(56) References Cited

U.S. PATENT DOCUMENTS

| | | | |
|---|---|---|---|
| 6,850,841 B1 | 2/2005 | Casino | |
| 7,593,838 B2* | 9/2009 | Winter | G01S 7/4004 |
| | | | 701/93 |
| 8,195,394 B1 | 6/2012 | Zhu et al. | |
| 8,355,540 B2* | 1/2013 | Walter | G06K 9/00798 |
| | | | 382/104 |
| 8,725,404 B2 | 5/2014 | Kmiecik et al. | |
| 2002/0183928 A1* | 12/2002 | Winter | G01S 7/4004 |
| | | | 701/300 |
| 2005/0283699 A1* | 12/2005 | Nomura | G01C 21/32 |
| | | | 714/746 |
| 2009/0132162 A1* | 5/2009 | Kudoh | G01C 21/36 |
| | | | 701/533 |
| 2009/0138497 A1 | 5/2009 | Zavoli et al. | |
| 2009/0326752 A1* | 12/2009 | Staempfle | G01S 13/931 |
| | | | 701/31.4 |
| 2010/0286899 A1 | 11/2010 | Jain et al. | |
| 2011/0040468 A1* | 2/2011 | Leineweber | G08G 1/163 |
| | | | 701/96 |
| 2011/0043377 A1 | 2/2011 | McGrath et al. | |
| 2013/0182957 A1 | 7/2013 | Wujcicki | |
| 2013/0322694 A1 | 12/2013 | Arcot et al. | |
| 2014/0118182 A1 | 5/2014 | Oh et al. | |
| 2014/0142799 A1 | 5/2014 | Ferguson et al. | |
| 2014/0152432 A1 | 6/2014 | Zobel et al. | |

FOREIGN PATENT DOCUMENTS

| | | |
|---|---|---|
| DE | 102012210344 A1 | 12/2013 |
| EP | 1674827 A1 | 6/2006 |
| JP | 2012173266 A | 9/2012 |

OTHER PUBLICATIONS

V.L. Knoop et al., Single Frequency Precise Point Positioning; Obtaining a Map Accurate to Lane-Level, 2013.

* cited by examiner

LEARNING LANES FROM RADAR DATA

FIELD

The following disclosure relates to determining lane information of a roadway segment from vehicle probe data, such as camera sensor data or radar sensor data.

BACKGROUND

Traffic reporters may rely on traffic information made available by government agencies. Also, online traffic reporting resources may suffer from infrequent updates, data entry errors, or delayed data input. These factors cause the traffic reporter to fail to timely report a major traffic incident or congestion, or continue to report an incident or congestion well after the incident or congestion has been cleared. Therefore, providing real time, accurate traffic information, such as for use in a navigation system (and, in particular, for an autonomous vehicle), is a continuing effort.

To enable automated driving, route validation and planning beyond a vehicle's sensor range is important. For example, it is important to accurately and timely detect low latency road condition changes and abnormalities such as lane closures and slipperiness of the road. Detection of road condition changes or abnormalities is also important for lane positioning as the road structure and identified objects may function as references for matching vehicle sensor perception. Near real-time updates of the road structure and objects may provide correct lane positioning for the automated vehicle navigation system.

SUMMARY

Systems, methods, and apparatuses are provided for determining lane information of a roadway segment from vehicle probe data.

In one embodiment, the method comprises receiving, using a processor, probe data from vehicle camera sensors from a plurality of vehicles at a road segment, the probe data comprising lane marking data for the road segment. The method further comprises identifying any lane markings present from the probe data for: (1) a left boundary of the lane of travel, (2) a right boundary of the lane of travel, (3) a left boundary of an adjacent lane to the left of the lane of travel, and (4) a right boundary of an adjacent lane to the right of the lane of travel. The method further comprises coding the identified lane markings, wherein solid lane lines, dashed lane lines, and unidentified or non-existing lane lines are differentiated. The method further comprises compiling the coded lane markings from the plurality of vehicles at the road segment in a database. The method further comprises predicting a number of lanes at the road segment from the database of coded lane markings.

In another embodiment, the method comprises receiving probe data from radar sensors of vehicles at a road segment, the probe data comprising (1) an identification of static objects and dynamic objects in proximity to the respective vehicles at the road segment and (2) geographic locations of the static objects and the dynamic objects. The method further comprises determining, using a processor, a reference point at the road segment from the identified static objects. The method further comprises calculating lateral distances between the identified dynamic objects and the reference point, the lateral distance measured along an axis perpendicular to lanes of the road segment. The method further comprises ascertaining a number of lanes at the road segment from a distribution of the calculated distances of the identified dynamic objects from the reference point.

In another embodiment, the method comprises receiving probe data from a radar sensor of at least one vehicle at a road segment, the probe data comprising (1) an identification of static objects in proximity to the respective vehicle at the road segment and (2) geographic locations of the static objects. The method further comprises determining, using a processor, a first road boundary and a second, opposite road boundary at the road segment from the identified static objects. The method further comprises computing a width of the road segment from the identified first and second road boundaries. The method further comprises estimating a number of lanes at the road segment by dividing the computed width of the road segment by a predetermined average lane width.

In one embodiment, the apparatus comprises at least one processor and at least one memory including computer program code for one or more programs; the at least one memory and the computer program code configured to, with the at least one processor, cause the apparatus to at least perform: (1) receive probe data from vehicle camera sensors from a plurality of vehicles at a road segment, the probe data comprising lane marking data for the road segment; (2) identify any lane markings present from the probe data for a left boundary of the lane of travel, a right boundary of the lane of travel, a left boundary of an adjacent lane to the left of the lane of travel, and a right boundary of an adjacent lane to the right of the lane of travel; (3) code the identified lane markings, wherein solid lane lines, dashed lane lines, and unidentified or non-existing lane lines are differentiated; (4) compile the coded lane markings from the plurality of vehicles at the road segment in a database; and (5) predict a number of lanes at the road segment from the database of coded lane markings.

In another embodiment, the apparatus comprises at least one processor and at least one memory including computer program code for one or more programs; the at least one memory and the computer program code configured to, with the at least one processor, cause the apparatus to at least perform: (1) receive probe data from radar sensors of vehicles at a road segment, the probe data comprising an identification of static objects and dynamic objects in proximity to the respective vehicles at the road segment and geographic locations of the static objects and the dynamic objects; (2) determine a reference point at the road segment from the static objects; (3) calculate lateral distances of the identified dynamic objects from the reference point, the lateral distance measured along an axis perpendicular to lanes of the road segment; and (4) ascertain a number of lanes at the road segment from a distribution of the calculated distances of the identified dynamic objects from the reference point.

In another embodiment, the apparatus comprises at least one processor and at least one memory including computer program code for one or more programs; the at least one memory and the computer program code configured to, with the at least one processor, cause the apparatus to at least perform: (1) receive probe data from a radar sensor of at least one vehicle at a road segment, the probe data comprising an identification of static objects in proximity to the respective vehicles at the road segment and geographic locations of the static objects; (2) determine a first road boundary and a second, opposite road boundary at the road segment from the identified static objects; (3) compute a width of the road segment from the identified first and second road boundaries; and (4) estimate a number of lanes at the road segment by dividing the computed width of the road segment by a predetermined average lane width.

BRIEF DESCRIPTION OF THE DRAWINGS

Exemplary embodiments are described herein with reference to the following drawings.

DETAILED DESCRIPTION

Figure 1:
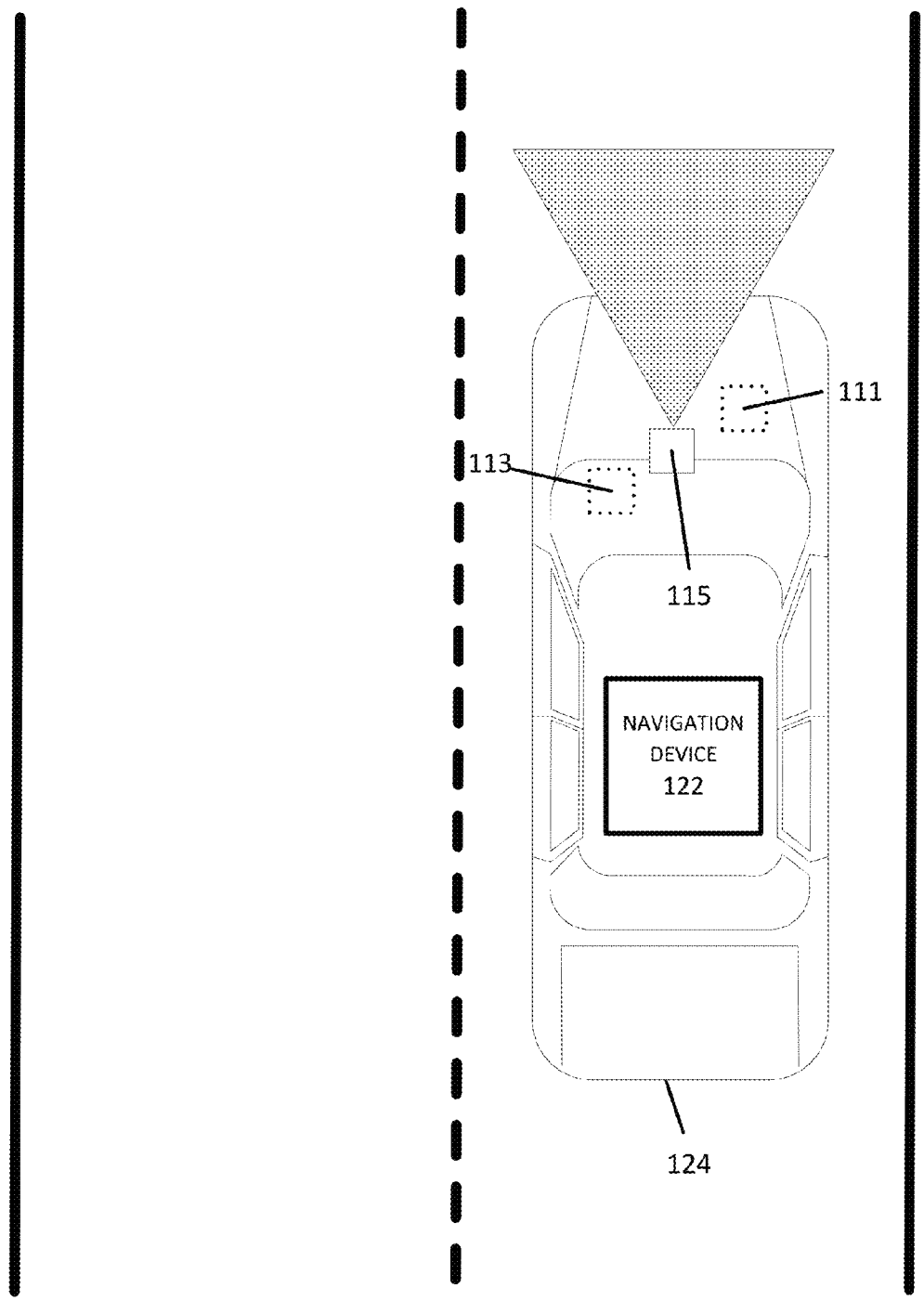
FIG. 1 illustrates an example of a vehicle comprising camera or image sensors for gathering surrounding data, such as lane marking data near the vehicle.

The following embodiments include determining lane information (e.g., number of lanes, current lane location, and lane width) of a road segment from vehicle probe data.

As used herein, a "road" or "roadway" may refer to any traveling lane or pathway that may be capable of being monitored for traffic congestion/incident detection, or may become capable of being monitored for traffic congestion/incident detection in the future (e.g., a highway, city street, bus route, train route, walking/biking pathway, waterway).

Collecting Vehicle Probe Data

Road or lane information for a selected road segment may be determined through the collection, reporting, and analysis of vehicle probe data from a plurality of vehicles. In certain embodiments, for each vehicle of the plurality of vehicles, the vehicle probe data is collected by at least one vehicle sensor. The vehicle sensors are configured to identify the surroundings and the location of the probe vehicle (e.g., car, truck, motorcycle, bicycle, bus). The sensors may include Global Positioning System (GPS) identification, light detection and ranging (LIDAR), radar, and/or cameras for computer vision. Proximity sensors may aid in parking the vehicle. The proximity sensors may detect the curb or adjacent vehicles.

In other embodiments, vehicle probe data may be collected with a navigation device transported in or on a probe vehicle. The navigation device may be configured to calculate probe data such as geographic location, speed, and/or heading of the probe vehicle or traveler. The probe data may include speed, heading, location, timestamp, etc., as obtained from a single sensor such as GPS or a combination of sensors such as GPS, accelerometer, and gyrometer. In certain embodiments, the navigation device generates a message that provides at least one of (1) geographic location, (2) speed, (3) heading, and/or (4) vehicle identification (including timestamp), and sends the message to a server for processing.

In certain embodiments, the probe vehicle is an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

FIG. 1 illustrates example sensors for a vehicle 124. For example, an engine sensor 111 may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. A vehicle sensor 113 may include a steering wheel angle sensor, a speedometer sensor, or a tachometer sensor.

A vehicle sensor 115 may be a camera, a light detection and ranging (LIDAR) sensor, a radar sensor, or an ultrasonic sensor. A vehicle sensor 115 may determine road status such as the shape or turns of the road, the existence of speed bumps, the existence of pot holes, the wetness of the road, or the existence or ice, snow, or slush.

In certain embodiments, a vehicle sensor 115 (e.g., camera) may identify lane or guide markings on the road, such as the left and right boundaries of the lane the vehicle is traveling (i.e., the current lane), as well as any immediate adjacent lane boundaries (i.e., the adjacent left lane boundary and the adjacent right lane boundary), to the extent the adjacent lanes exist. In some embodiments, the vehicle sensor 115 (e.g., camera) may identify additional lane lines beyond the immediate adjacent lane boundaries (to the extent additional lanes are present).

In certain embodiments, a vehicle sensor 115 (e.g., radar sensor) may detect stationary (static) and/or moving (dynamic) objects in the vicinity of the vehicle sensor.

A vehicle sensor 115 may also identify the angle between the trajectory path of the vehicle and a lane marking. A vehicle sensor 115 may also be able to gather information to determine the vehicle's distance from the current lane's left or right boundary.

Reporting Probe Data

The vehicle or navigation device may communicate with a network, wherein the probe data collected from the navigation device or vehicle sensors may be transmitted through the network and stored in a map developer database or server. The vehicle or navigation device may provide real-time reporting of probe data to the map developer database, or may transmit collected data at defined intervals of time. In certain embodiments, the probe data comprises metadata collected from the various vehicle sensors, such as a camera sensor. For example, the vehicle camera sensor may analyze the road images for lane markings and store its analyzed data within the vehicle or navigation database for eventual reporting to an external network.

The transmitted probe data may then be analyzed by a processor within the map developer system.

Determination of Number of Lanes

In certain embodiments, transmitted probe data from a plurality of vehicles may be used to determine the number of lanes located at the road segment location. In some embodiments, data collected within a relatively short longitudinal distance (e.g., 10-20 meters) may be aggregated together for analysis, as it may be presumed that the road segment contains the same number of lanes throughout the longitudinal distance.

Detection of Lanes with a Camera

In certain embodiments, the vehicle sensor is a camera configured to analyze the road images and/or identify lane or guide markings on the road segment. For example, the camera vehicle sensor may capture images, analyze the road for lane markings, and/or identify the left boundary and the right boundary of the lane the vehicle is traveling (i.e., the current lane). Furthermore, to the extent the adjacent lanes exist, the camera vehicle sensor may also capture images, analyze the road, and/or identify the immediate adjacent lane boundaries (e.g., the adjacent left lane boundary and the adjacent right lane boundary of the current lane). In some embodiments, the camera may capture images and/or identify additional lane boundaries beyond the immediate adjacent lane boundaries.

In certain embodiments, captured images or lane marking metadata from the vehicle sensor may be transmitted to a processor for further analysis. The processor may be an external processor (e.g., map developer database) or an internal vehicle processor. The processor may identify and/or code the reported lane markings. In certain embodiments, identification of a solid road line may be coded as "0." A dashed road line may be coded as "1." And, an unidentified segment (e.g., the absence of a line or an undetermined line) may be coded as "2." In certain embodiments, where road lanes are divided by multiple lines, such as a double solid line or a combined solid line and dashed line, the road line may be coded as "0" along with the single, solid lines. In embodiments where the processor is an internal vehicle processor, the identified or coded lane markings may be reported to an external processor over a connected network for compilation and analysis with other reported lane marking data.

For example, in FIG. 1, the vehicle sensor 115 may analyze the road markings in the vehicle's direction of travel. The vehicle sensor 115 may identify the left boundary of the lane the vehicle is traveling (a dashed line) (which is coded as "1" by an internal or external processor), and the right boundary of the lane the vehicle is traveling (a solid line) (coded as "0"). Furthermore, the vehicle sensor 115 may identify the immediate adjacent left lane boundary (a solid line) (which is then coded as "0"). The vehicle sensor 115 may attempt to identify the immediate adjacent right lane boundary, which does not exist. As such, the adjacent right lane boundary line is coded as "2."

In certain embodiments, the coded lane markings may be stored in the map database as a "combination code" or series of four numbers in order of left adjacent lane line, left current lane line, right current lane line, and right adjacent lane line. For example, the combination code for the example discussed above for FIG. 1 is [0 1 0 2].

A plurality of coded lane markings from one or more vehicles at the road segment may be compiled to provide a database of coded lane markings. In certain embodiments, the database of coded lane markings may be analyzed to determine how many lanes are on the road at the particular location.

In certain embodiments, a machine learning algorithm may be used to determine the overall number of lanes for the road segment by comparing the database of coded lane markings with a predetermined probability distribution database that correlates individual coded lane combinations with percentages that a road segment includes a specific number of lanes. In one embodiment, a Random Forest algorithm is used to determine the total number of lanes at the road location or segment.

In certain embodiments, the predetermined probability distribution database is compiled from using ground truth data and the machine learning algorithm may be trained with the use of the ground truth data (i.e., verified data for the road segment). For example, the database of coded lane markings may be compiled in a histogram, where probabilities of each combination code are related with the number of actual lanes on the road (as determined by ground truth data).

Figure 2:
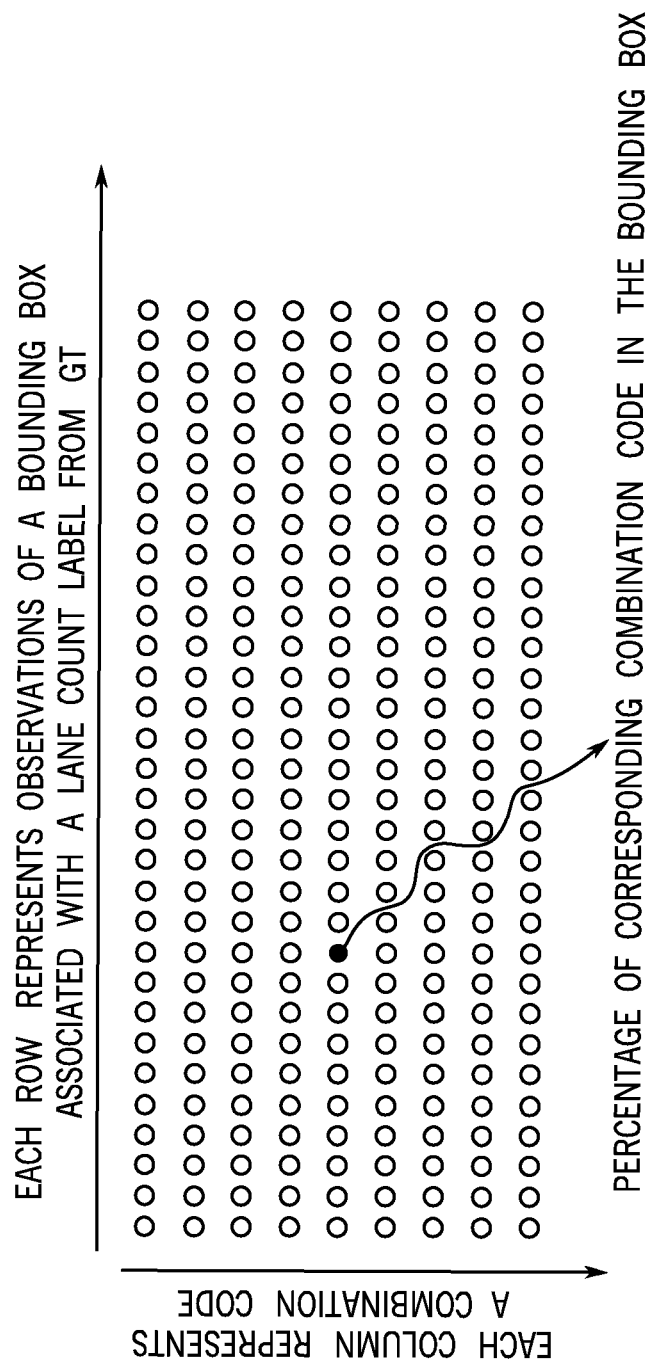
FIG. 2 illustrates an example of tabulated combination codes for determining a total number of lanes on a road segment.

In some embodiments, combination codes may be tabulated in a chart depicting the percentage of corresponding results, where each column represents a combination code, and each row represents observations within a bounding box location associated with a lane count label from ground truth data. FIG. 2 depicts an example of tabulated combination codes, wherein the "0" data within the chart may refer to any percentage. The total number of lanes may be determined using the calculated and tabulated percentages for each combination code at each location of the road segment.

Detection of Lanes with a Radar Sensor

In certain embodiments, the vehicle sensor is a radar sensor configured to use radio waves to identify objects in the proximity or bounding box of the vehicle (e.g., the range of the radar sensor). Through the detection and analysis of the objects within a bounding box of each vehicle, the radar sensor may assist in determining lane characteristics of the road segment. In certain embodiments, the radar sensor is front facing (i.e., in the direction of travel) has a range upwards of 100-200 meters in front and to the sides of the vehicle.

The radar sensor may be configured to provide a unique identifier for each detected object, and track the object over a period of time (that is, when the object remains within the range of the radar sensor). The radar sensor may be able to track whether the surrounding, identified object is a static or dynamic object. For example, the radar sensor may be able to detect whether the object is (1) a static object such as a road sign (e.g., a speed limit sign or a distance marker (kilometer/mile)) positioned along the side of the road or (2) a dynamic/moving object (e.g., vehicle) traveling on the road.

Through the detection process, the radar sensor may be able to determine whether the identified object is a newly identified object, a previously measured object, or a predicted object.

In some embodiments, the radar sensor may detect the position of the object relative to the vehicle (e.g., the object's lateral distance to the left or right of the respective vehicle, the object's distance in front of the vehicle, or the altitude distance above the vehicle). Additionally, the radar sensor may be able to detect the direction and/or speed of the object. For example, the radar sensor may be able to identify and define an object as a standing static object, a stopped object, an approaching object (moving closer to the vehicle over time, or moving in an opposite direction on the other side of the road), or a distancing object (moving away from the vehicle over time). In certain embodiments, identified objects/vehicles moving in the opposite direction of travel are discarded from analysis of the number of road lanes.

In certain embodiments, the static and dynamic objects detected by the vehicle's radar sensor within a defined bounding box (such as a defined distance in front and to the sides of the vehicle) may be stored in a map developer database for further analysis. For example, the objects detected by a vehicle may be plotted on a graph, where the x-axis refers to the lateral distance to the left and right of the vehicle sensor (i.e., the distance measured along an axis perpendicular to the lanes or direction of travel of the road segment) and the y-axis refers to the longitudinal distance in front of the vehicle. Each identified and unique dynamic object may be plotted on the graph in a different color or symbol. In certain embodiments, dynamic objects traveling in the opposite direction (e.g., on the other side of a road) may be discarded and not included in the graph or further analysis.

Figure 3:
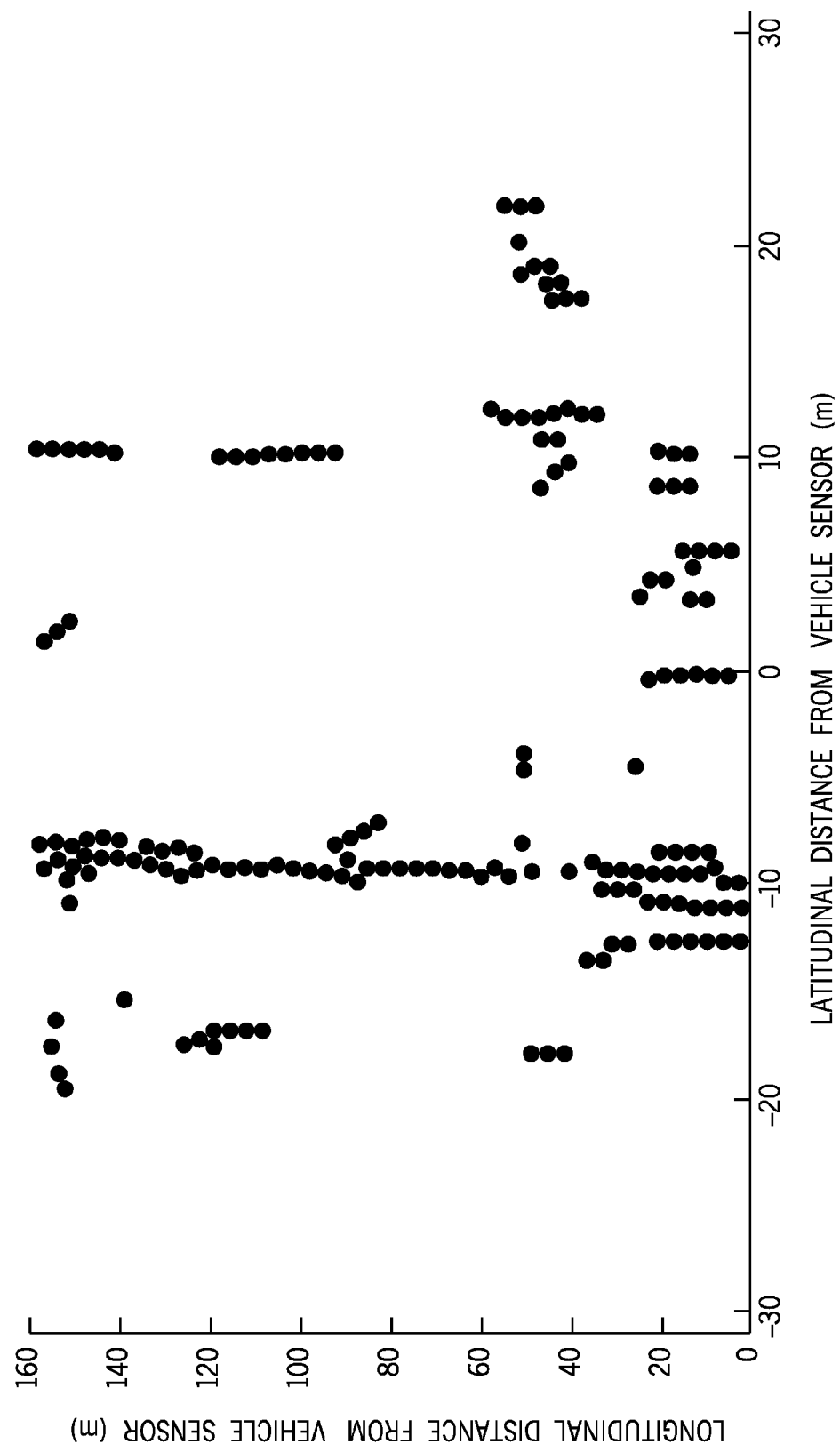
FIG. 3 illustrates an example of a chart mapping various static and dynamic objects identified by a vehicle radar sensor.

FIG. 3 illustrates one embodiment of an x-, y-graph displaying the various dynamic objects identified by a vehicle radar sensor. As shown in the figure, the vehicle sensor location is positioned at the intersection of the x- and y-axes (at 0, 0). Identified objects to the left of the vehicle are depicted in terms of negative distance values, while objects to the right of the vehicle are depicted in terms of positive distance values. For each vehicle, the identified dynamic objects within the bounding box may be placed on the lateral axis, perpendicular to the roadway and direction of travel of the vehicle. To combine each vehicle's data together, the collected probe data is normalized.

In certain embodiments, the probe data is normalized through the identification of a common reference point to compare the data and relative distances. For example, a reference point may be determined from the identified static objects. In some embodiments, the reference point is a road boundary (i.e., the left or right boundary of the road). Based on the static nature of objects, and the positioning of those objections, a processor may identify those objects as being placed along the side of the road, therein forming a road boundary. For example, in some embodiments, the left boundary of the road may be determined based on the respective vehicle detecting static objects (e.g., road signs, road curbs, barriers, or guard rails) to the left of the vehicle.

With the identification of a reference point (e.g., road boundary), the identified dynamic objects may be normalized with the reference point and combined together. In other words, the lateral distance of the identified dynamic objects may be calculated with relation to the road boundary or reference point, instead of the vehicle. Each vehicle's data may then be combined together with comparison to the reference point or plurality of reference points.

Following calculation of the lateral distance of the dynamic objects and accumulation of data, the number of lanes of the road segment may be determined from the distribution of the calculated lateral distances. In certain embodiments, the calculated lateral distances of the various dynamic objects are compiled and sorted into various "buckets" or bins, wherein each bucket refers to a tabulated collection of data points that fall within a specified range (i.e., distance) from the vehicles. For example, dynamic objects calculated or normalized to be between 0 and 1 meter from the road boundary are stored in one bucket, while objects determined to be between 1 and 2 meters are stored in a second bucket, and so on. The tabulated data may be plotted in a histogram to show the distribution of data, wherein the x-axis represents the different bins of data for the distance from the identified reference point or road boundary, and the y-axis represents the number of detected moving objects by the various radar sensors for each bin. In certain embodiments, the histogram will reveal peaks in the data that can correlate with the center of each lane of travel (as most moving objects presumably travel in the center of the lane). In other words, the number of vehicle lanes may be determined based on the number of identified peaks in the histogram (i.e., a "peak-based" approach).

Figure 4:
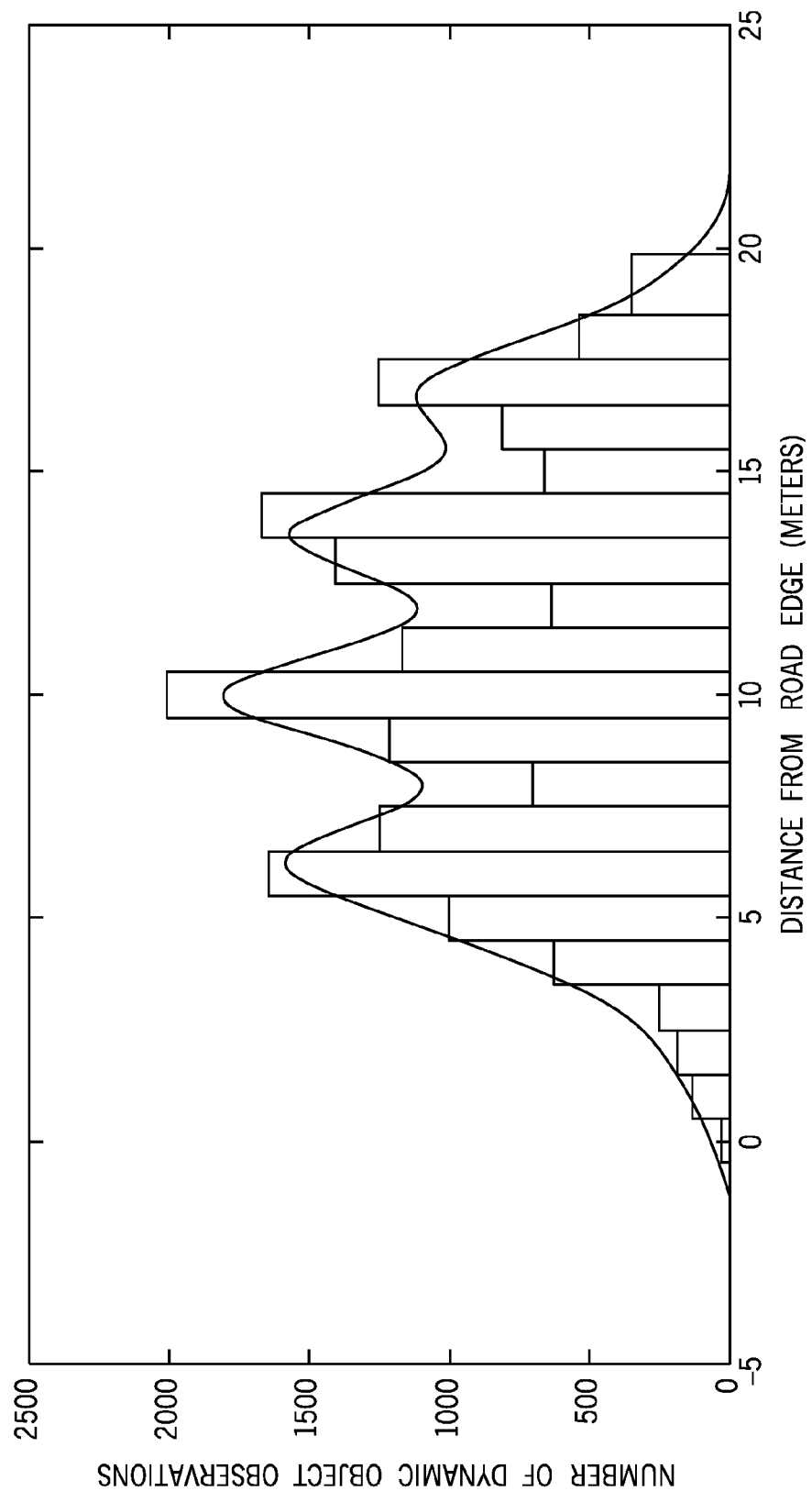
FIG. 4 illustrates an example of a histogram for a number of observed objects by radar sensors in relation to their distance from a reference point (such as a road boundary).

For example, FIG. 4 illustrates one example showing various bins of observed data between 0 and 20 meters from an identified static reference point (e.g., road boundary). The chart shows peaks in the data at approximately 6, 10, 14, and 17 meters from the road boundary. Based on the histogram, the compiled data indicates that the road is four lanes wide.

In alternative embodiments, the number of lanes at a particular road segment may be determined using a "range-based" approach. Under the range-based approach, the radar sensor is configured to identify static objects (e.g., road signs) located on each side of the vehicle and calculate their distance from the vehicle.

In certain embodiments, the road boundaries (i.e., the left or right boundary of the road) may be determined from a collection of identified static objects. Based on the static nature of objects, and the positioning of those objections, a processor may identify those objects as being placed along the side of the road, therein forming a road boundary. For example, in some embodiments, the boundaries of the road may be determined based on at least one vehicle detecting static objects (e.g., road signs, road curbs, barriers, guard rails, or other static objects having a height from the road surface at the side of the road) to the left and the right of the traveling vehicle.

The vehicle sensor may transmit the observations to a map developer database, wherein the static object observations are analyzed to determine the left and right road boundaries. In certain embodiments, the left and right road boundaries may be identified as the farthest observed cluster of static objects to the left and right of the vehicle. Outliers in the observations may be determined and removed from the cluster during the analysis.

In the range-based approach, following the determination of the left and right road boundaries, the total distance of the road may be calculated by adding the distance from the vehicle to the road boundary to the left with the distance from the vehicle to the road boundary to the right. Observations from a plurality of vehicles for a particular road segment may be combined together to determine an average total road width.

The total number of lanes may be calculated by dividing the calculated road width by a predetermined lane width amount and rounding to the nearest integer. In some embodiments, an average lane width is between 3 meters and 4 meters wide. In other embodiments, the predetermined lane width is 3.5 meters and 3.7 meters. For example, if the radar sensor data provides an average road width of 11 meters, the number of lanes at the road segment determined to be 3 lanes (i.e., 11/3.5=3.17 lanes, or 11/3.7=2.97 lanes).

In certain embodiments, in order to train the processor's peak-based or range-based lane calculations, the calculations may be verified with ground truth data.

Lane Number Identification

In certain embodiments, following the determination of the total number of lanes of travel at the road segment, the vehicle sensor may assist in identifying which lane (i.e., a lane number) the vehicle is traveling.

A similar or different algorithm may be used to calculate the vehicle's lane number as the algorithm for determining the total number of lanes. In certain embodiments, the algorithm used to determine the lane number is a "Dead Reckoning" algorithm, wherein the vehicle's current position may be determined based upon previously determined positions of the vehicle on the road segment. Through the use of the collected vehicle sensor data, the Dead Reckoning algorithm may determine the position of the vehicle based upon total number of lanes at the road segment (as previously calculated), the lane markings at the road segment, the geographic location of the vehicle, the vehicle's direction of travel (e.g., the heading angle between the vehicle and a road lane marking), and/or the vehicle speed.

The lane numbers may be identified from left to right, where the far left lane number of the road segment is identified as "1," and the far right lane number of the road segment is identified as the total number of lanes (e.g., if there are four total lanes identified, the lane number is "4").

In order to evaluate the accuracy of the determined lane number, check points may be established along a particular road segment, wherein only the outer edges of the far left road lane and the far right road lane are marked with solid lane lines. Any internal lanes are separated with dashed lane markings. Upon analysis and determination of the lane number, if the vehicle sensor registers a solid lane marking on the immediate left, the current lane number is "1." If the vehicle sensor registers a solid lane marking on the immediate right, the current lane number is identified as the total number of lanes (e.g., if there are four total lanes identified, the lane number is "4"). In certain embodiments, if the vehicle sensor registers a solid lane marking in the adjacent left lane, then the current lane number is "2." Additionally, if the vehicle sensor registers a solid lane marking in the adjacent right lane, the current lane number is the total number of lanes minus 1 (e.g., if there are four total lanes identified, the lane number is "3"). Furthermore, the vehicle speed and heading angle may also be used in the determining the accuracy of the lane number prediction, wherein lane changes of the vehicle may be monitored. If the Dead Reckoning evaluation makes sense at both ends of the segment, the algorithm is considered successful.

In certain embodiments, where a radar sensor is used to determine the number of lanes on the road, the lane number may be determined by identifying the vehicle's present location from the nearest peak in the histogram. Based on the proximity to the center of a lane, as determined by the analyzed and plotted data, it is presumed that the vehicle is in that particular lane.

In other embodiments, the lane number may be determined by identifying the vehicle's present distance from the road edge and dividing that distance by an average road lane width (e.g., 3.5 meters or 3.7 meters). In certain embodiments, the lane numbers are defined in ascending order from left to right (i.e., the far left lane is identified as lane "1"). In such embodiments, a radar sensor may assist in determining the vehicle's distance from the identified left boundary of the roadway and dividing that distance by the average road lane width. For example, the radar may detect the vehicle is presently 7.5 meters from the left boundary. Based on an average road lane width of 3.5 or 3.7 meters, a processor determines that the vehicle is presently in the lane 2.

Lane Width Calculation

In certain embodiments, to the extent the lane width is not pre-defined with a typical lane width value, the width of each lane may be calculated. Such a lane width calculation may use the previously determined total number of lanes and individual lane number identified for a particular vehicle. In one embodiment, a consensus-type algorithm is used to estimate lane width. In other embodiments, an iterative algorithm such as a random sample consensus (RANSAC) algorithm is used to estimate lane width.

For instance, calculating the lane width for each lane at the road segment may involve collecting width estimates from the vehicle sensor for one lane. In certain embodiments, the selected lane is not the right-most lane, as the right-most lane may be expanding and contracting as the lane forms and ends along segments of the road.

Under the RANSAC algorithm approach, the vehicle sensor may identify the left and right lane boundaries and calculate a distance between the vehicle and the left lane and the right lane. The two distances may be combined together to form an estimated lane width for the lane. Through the algorithm, the various calculated lane widths may be grouped together, and a model may be fit to the data to determine a calculated lane width. In certain embodiments, additional data (e.g., other lanes) may be tested against the fitted model to verify the calculated lane width. In some embodiments, calculated lane widths may be compared with average or typical lane widths for roads (e.g., 3.7 meters wide) for verification.

Lane Connectivity

In certain embodiments, changes in the total lane count can be tracked along the road by comparing a determined lane count for a road segment with a determined lane count at an adjacent road segment. In other words, the forming, ending, or splitting of lanes (i.e., the lane connectivity) may be tracked when a difference is detected in the comparison. In some embodiments, the location of the lane connectivity changes may be identified within 20-30 meters of the ground truth data.

In some embodiments, lane transitions at road intersections may also be identified or tracked. For example, the direction of travel of each vehicle entering and exiting the intersection may be identified and recorded. Specifically, for each vehicle, the heading angle entering the intersection and the heading angle leaving the intersection is recorded. The two heading angles are used as input to assist in determining a path through the intersection. Based on a clustering of data from a plurality of vehicle inputs and projected paths, lane connectivity is determined through the intersection.

Reporting to Service Provider, Map Developer, or End-User

Following determination of the total lane count, lane number, lane width, and/or lane connectivity, the results may be stored or published within the map developer database. In some embodiments, the results may be reported to a third-party traffic service provider or map developer. In other embodiments, the traffic changes may be reported to an end-user navigation device (e.g., a vehicle navigation device or a vehicle operator/passenger navigation device) over a connected network. The updates to the map database and reports to the traffic provider, map developer, or end-user navigation device may take place in real-time, at defined increments in time, or at the request of the traffic provider, map developer, or end-user.

In some embodiments, in cases of autonomous or HAD vehicles, the vehicle may process the reported data and make a decision on whether to alert the operator or take action. In certain embodiments, the navigation device in the vehicle or another computer system in communication with the navigation device may include instructions for routing the vehicle or generate driving commands for steering the vehicle, shifting gears, increasing and decreasing the throttle, and braking based on the reported data.

Flowchart Embodiments

Figure 5:
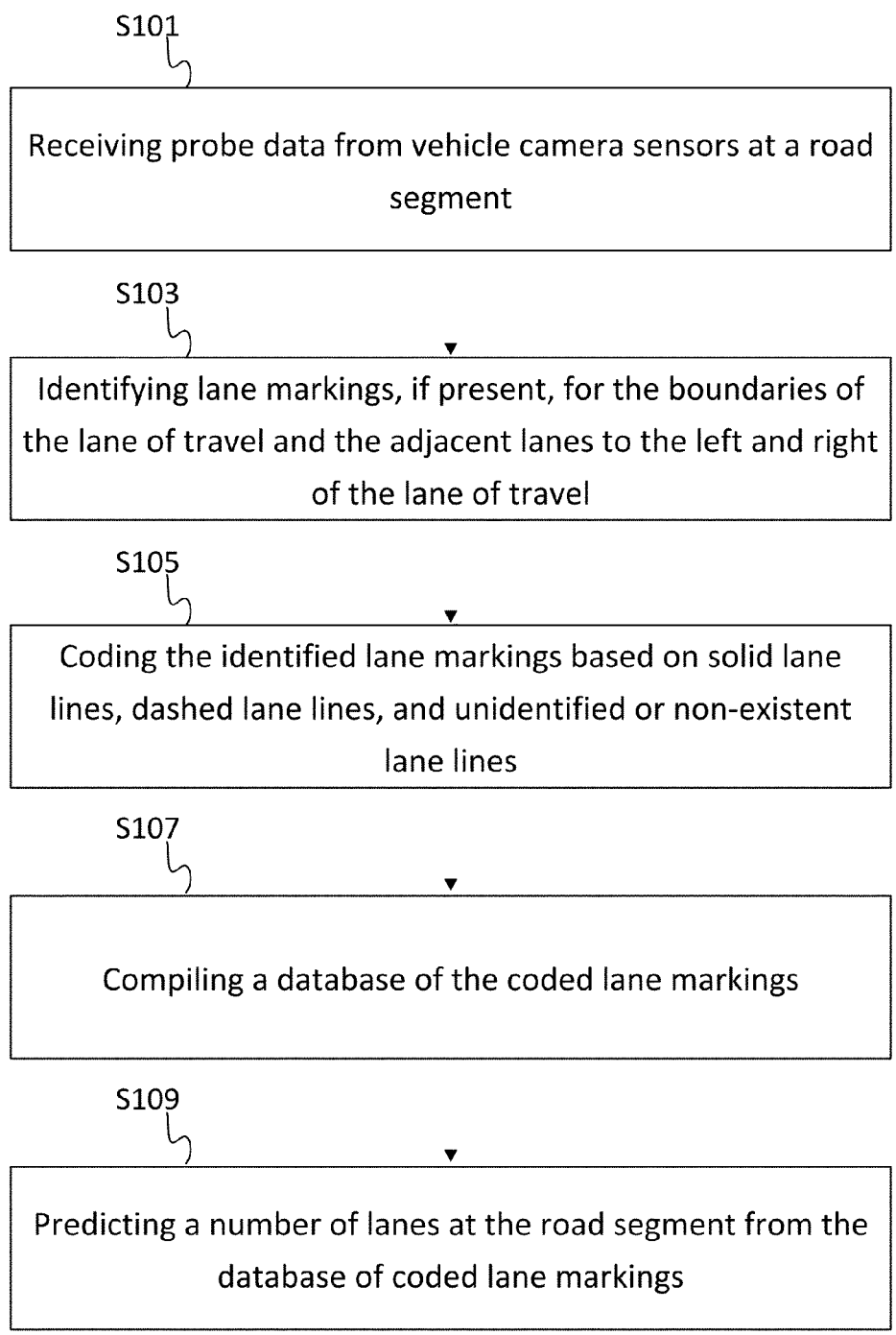
FIG. 5 illustrates an example flowchart for determining lane characteristics on a road segment using a camera sensor.

FIG. 5 illustrates one embodiment of a flowchart for determining lane characteristics of a road segment with a camera. The process of the flowchart may be performed by the vehicle camera sensor, navigation device, and processor and/or a server and its processor. Alternatively, another device may be configured to perform one or more of the following acts. Additional, fewer, or different acts may be included.

At act S101, probe data is received by vehicles traveling along a road segment. The probe data may comprise images or metadata of lane markings on a road segment.

At act S103, the processor identifies any lane markings present from the probe data in the metadata or camera image. In particular, the processor may identify the lane markings along the left and right boundaries of the lane of travel, as well as any lane markings in the adjacent lanes of travel to the left and right of the lane of travel. For example, the processor may identify the left boundary of an adjacent lane to the left of the lane of travel and the right boundary of an adjacent lane to the right of the lane of travel.

At act S105, the processor may code the identified lane markings, providing different codes or identifications for solid lane lines, dashed lane lines, and unidentified/non-existent lane lines. For example, a code of "0" may be provided for solid lane lines, a code of "1" for dashed lane lines, and a code of "2" for unidentified/non-existent lane lines.

At act S107, the coded lane markings are compiled together, therein providing a database of coded lane markings at the road location.

At act S109, the processor may predict the number of lanes at the road segment from the database of coded lane markings. In certain embodiments, the predicting of the number of lanes comprises using a machine learning algorithm to compare the database of coded lane markings with a probability distribution database that correlates individual coded lane combinations with percentages that the road segment includes a specific number of lanes. A machine learning algorithm such as a Random Forest algorithm may be used for such a comparison, wherein the predicted number of lanes at the road segment may be verified with ground truth data.

Figure 6:
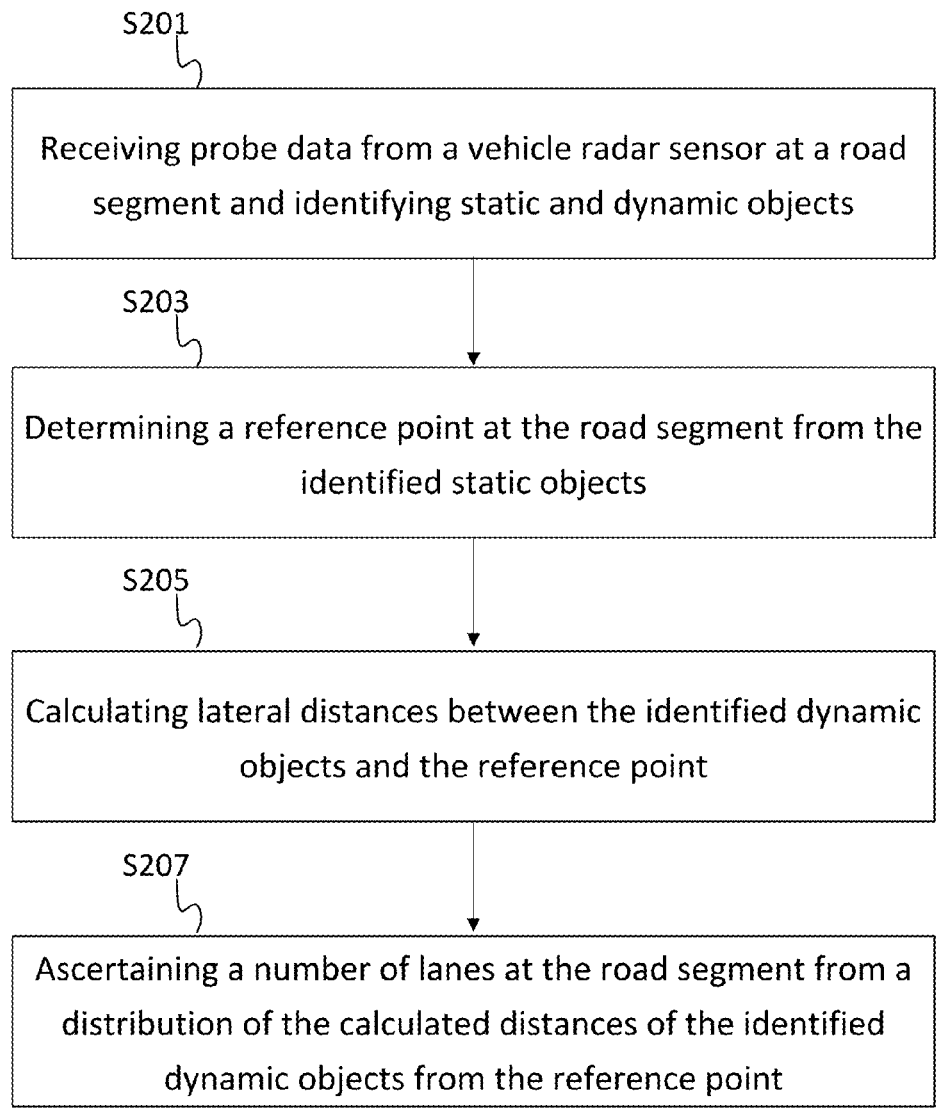
FIG. 6 illustrates an example flowchart for determining lane characteristics on a road segment using a radar sensor.

FIG. 6 illustrates one embodiment of a flowchart for determining lane characteristics of a road segment with a radar sensor. The process of the flowchart may be performed by the radar sensor, navigation device, and processor and/or a server and its processor. Alternatively, another device may be configured to perform one or more of the following acts. Additional, fewer, or different acts may be included.

At act S201, probe data is received by a processor. The probe data may be collected by a radar sensor on a vehicle, and transmitted to a processor for analysis. The probe data may include an identification of static objects and dynamic objects in proximity to the vehicle along the road segment. The probe data may also include an identification of the geographic location (e.g., GPS information) of each static object and dynamic object.

At act S203, a reference point is determined at the road segment from the identified static objects. The reference point may be a road boundary, which may be determined from a collection of static objects such as road signs, road curbs, barriers, or guard rails positioned at the edge of the road segment.

At act S205, lateral distances between the identified dynamic objects from the vehicles and the identified reference point are calculated. The calculations may involve the identification of the geographic location of each dynamic object and the location of the reference point (e.g., road boundary).

At act S207, the number of lanes at the road segment is ascertained. The number of lanes may be determined based upon a distribution of the calculated lateral distances of the identified dynamic objects from the reference point. For example, the calculated distances of the objects may be sorted in a histogram, and the number of lanes may be identified from the established peaks in the histogram data.

Figure 7:
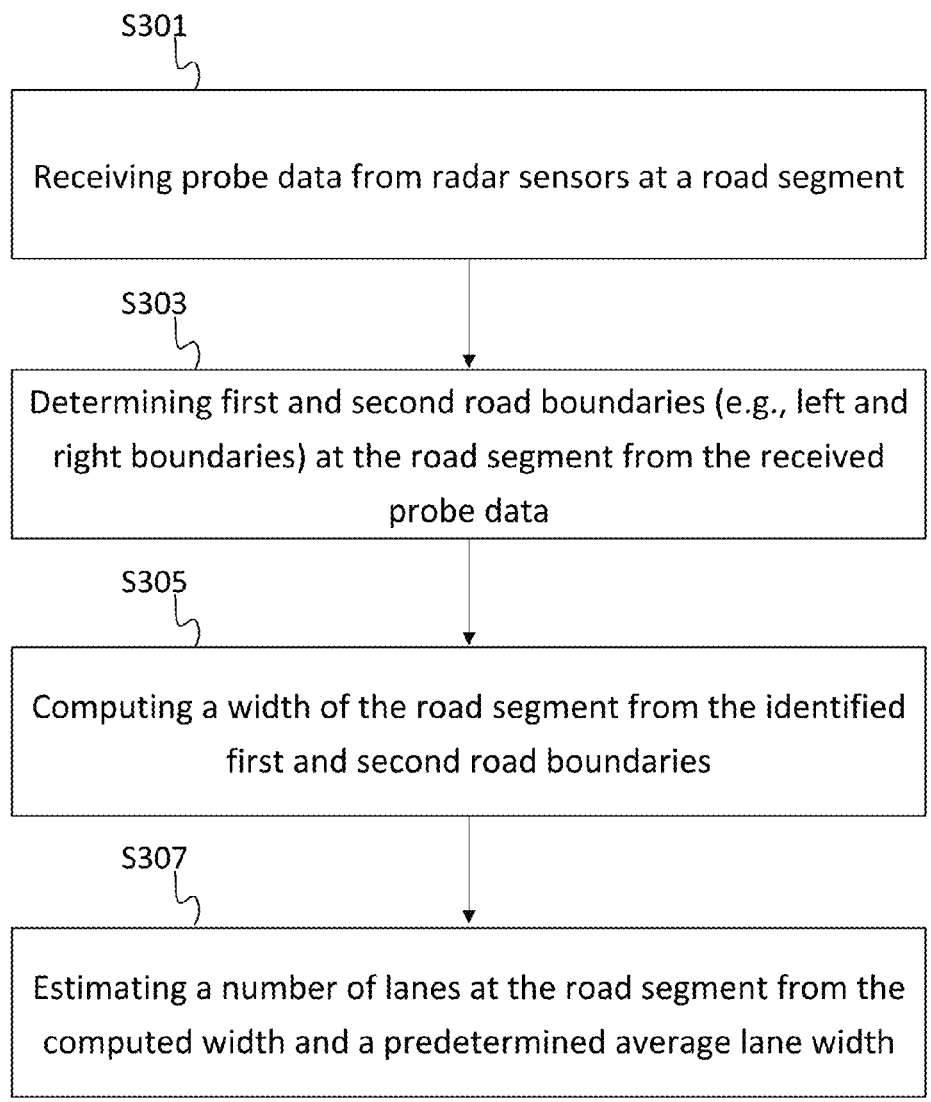
FIG. 7 illustrates an additional example flowchart for determining lane characteristics on a road segment using a radar sensor.

FIG. 7 illustrates an additional embodiment of a flowchart for determining lane characteristics of a road segment with a radar sensor. The process of the flowchart may be performed by the radar sensor, navigation device, and processor and/or a server and its processor. Alternatively, another device may be configured to perform one or more of the following acts. Additional, fewer, or different acts may be included.

At act S301, probe data is received by a processor. The probe data may be collected by a radar sensor on at least one vehicle, and transmitted to a processor for analysis. The probe data may include an identification of static objects in proximity to the respective vehicle along the road segment. The probe data may also include an identification of the geographic location (e.g., GPS information) of each static object.

At act S303, first and second road boundaries (e.g., left and right boundaries) are determined along the road segment, where the second boundary is on the opposite side of the road from the first boundary. The road boundaries may be determined or identified based upon the identification of static objects positioned or clustered along the opposite edges of the road.

At act S305, the width between the identified road boundaries is computed. The computation may involve the identification of the geographic locations of the road boundaries. In certain embodiments, the width of the road segment is computed by (1) determining, for each vehicle, a first distance between the first road boundary and the respective vehicle and a second distance between the second road boundary and the respective vehicle, (2) combining, for each vehicle, the first distance and second distance, and (3) averaging the combined distances for the plurality of vehicles.

At act S307, the number of lanes at the road segment is estimated. The number of lanes may be estimated by dividing the computed width of the road segment by a predetermined average lane width. In some embodiments, the predetermined average lane width is between 3-4 meters.

Navigation and Network System

Figure 8:
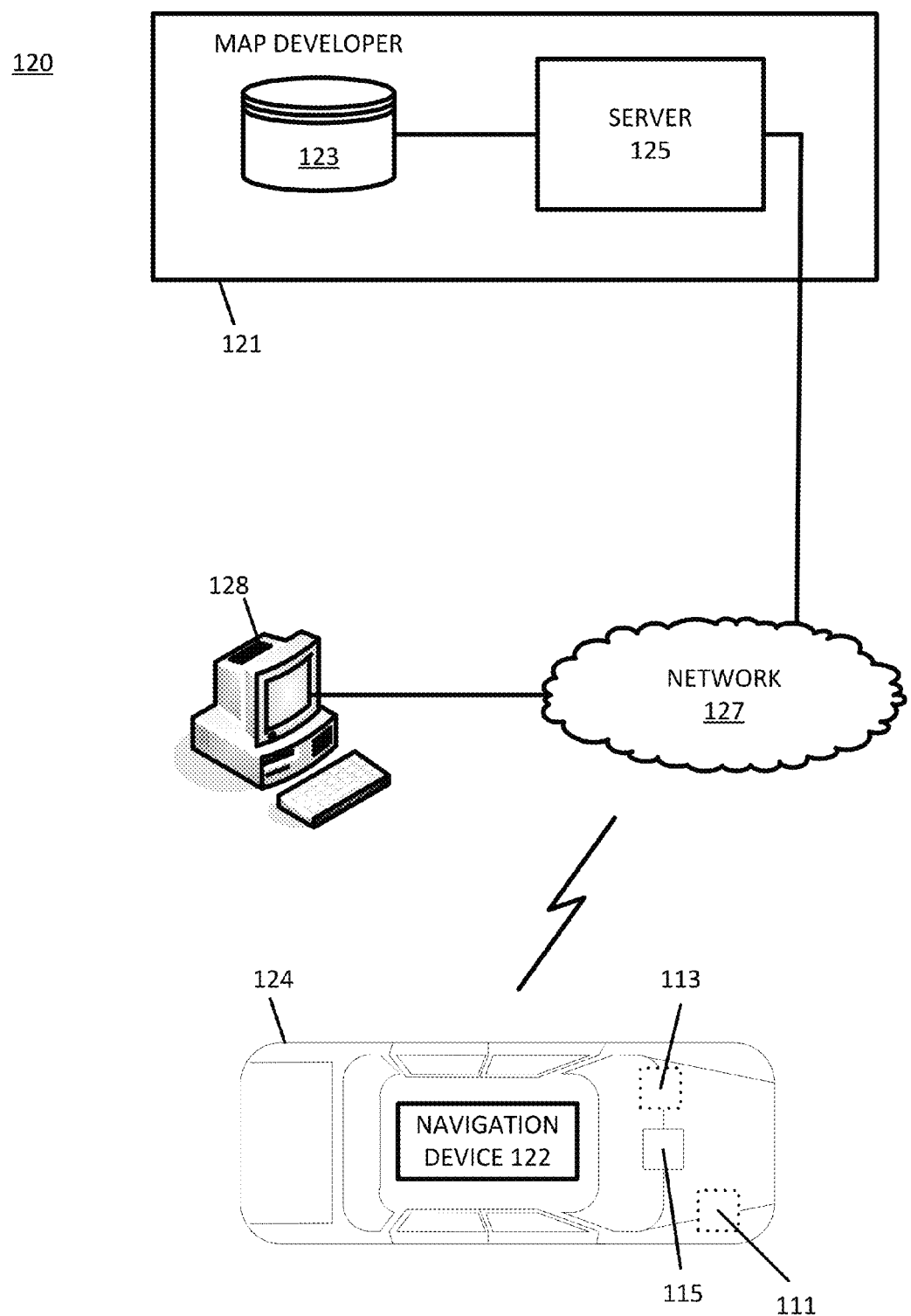
FIG. 8 illustrates an example system for relaying probe data between a vehicle and a data management system.

FIG. 8 illustrates an example system 120 for reporting and processing vehicle probe data from a sensor 115 and/or navigation device 122. The system 120 includes a developer system 121, one or more vehicle sensors 115, one or more navigation devices 122, a workstation 128, and a network 127. Additional, different, or fewer components may be provided. For example, many vehicle sensors 115, navigation devices 122 and/or workstations 128 connect with the network 127. The developer system 121 includes a server 125 and a database 123. The developer system 121 may include computer systems and networks of a system operator.

The vehicle sensor 115 and/or navigation device 122 may be carried by or installed within a vehicle 124. In some embodiments, the navigation device 122 may be a specialized autonomous driving computer. The navigation device 122 may calculate a vehicle confidence level based on at least one confidence factor. The confidence factors may be based on sensor data collected at the vehicle, environmental data received through the network 127, or responsiveness of the vehicle 124. Alternatively, the navigation device 122 may report sensor data from the vehicle sensor 115 to the server 125, which calculates the vehicle confidence level.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom.

The developer system 121 includes a server 125 and a server database 123. The developer system 121 may include computer systems and networks of a system operator such as HERE, NAVTEQ, or Nokia Corporation. The server database 123 is configured to store the vehicle probe data.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

The computing resources may be divided between the server 125 and the navigation device 122. In some embodiments, the server 125 performs a majority of the processing for calculating the vehicle confidence value and the comparison with the confidence threshold. In other embodiments, the computing device 122 or the workstation 128 performs a majority of the processing. In addition, the processing is divided substantially evenly between the server 125 and the computing device 122 or workstation 128.

Figure 9:
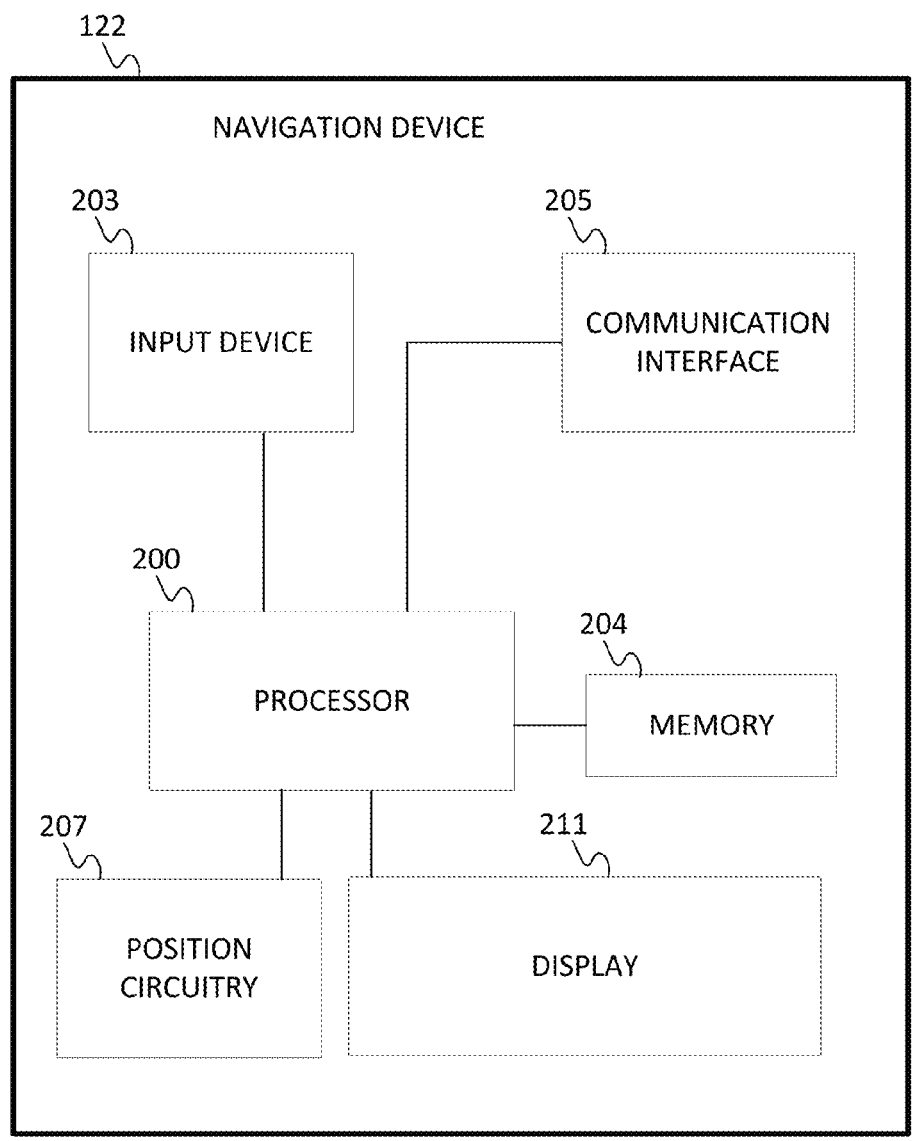
FIG. 9 illustrates an example navigation device of the system of FIG. 8.

FIG. 9 illustrates an exemplary navigation device 122 of the system of FIG. 8. The navigation device 122 includes a processor 200, a memory 204, an input device 203, a communication interface 205, position circuitry 207, and a display 211. Additional, different, or fewer components are possible for the mobile device/personal computer 122.

The processor 200 may be configured to receive sensor data indicative of the location of the navigation device 122 from the position circuitry 207. The processor 200 may also be configured to receive sensor data from a vehicle sensor 115 (e.g., a camera, LIDAR, radar, etc.). The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 10:
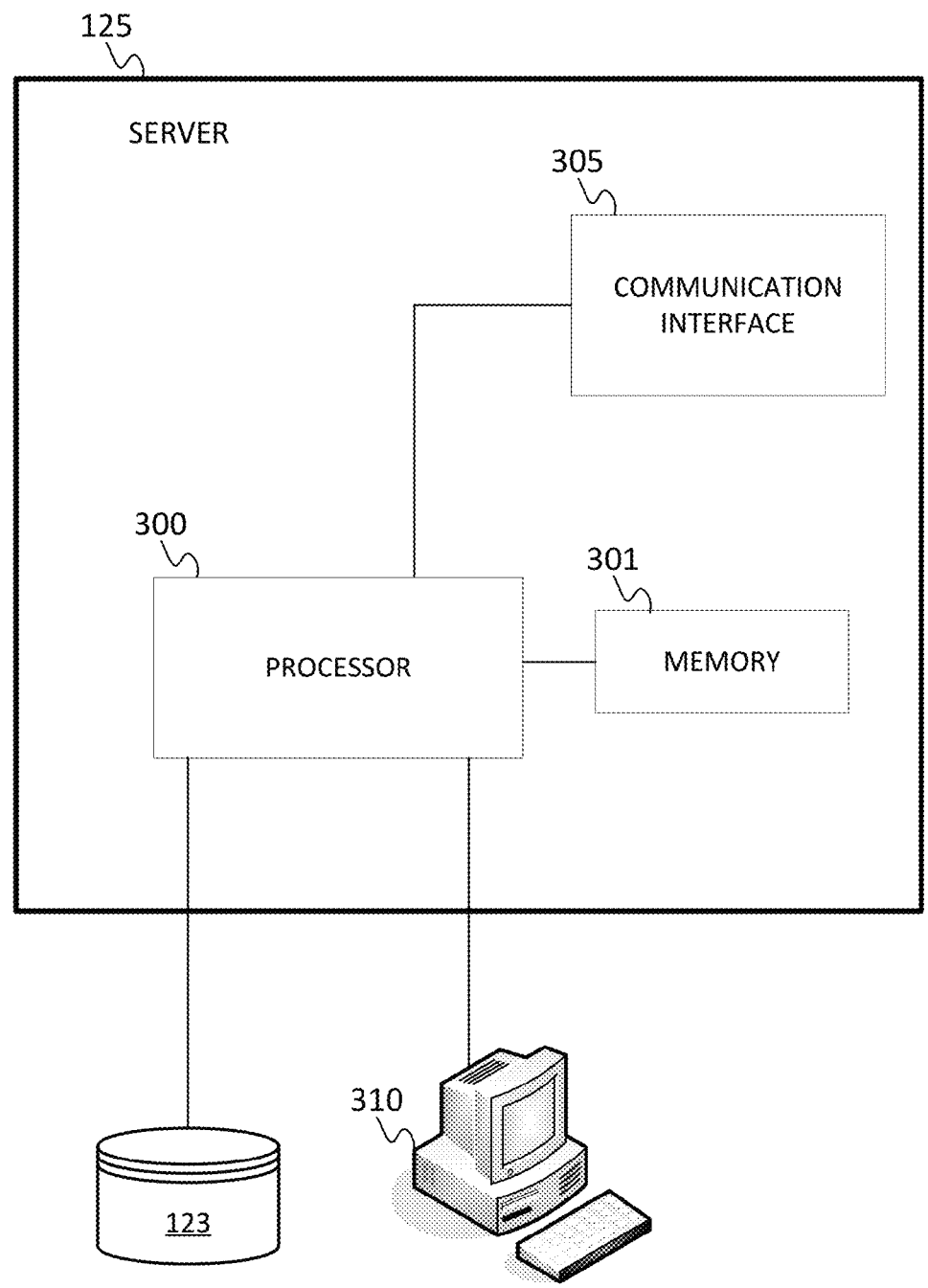
FIG. 10 illustrates an example server of the system of FIG. 8.

FIG. 10 illustrates an exemplary server 125 of the system of FIG. 8. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of methods described above. For example, the navigation device processor 200 may be configured to collect and transmit vehicle probe data for a roadway location.

In another embodiment, the server processor 300 may be configured to compile vehicle sensor data for a plurality of vehicles. The server processor 300 may also be configured to analyze and determine the total number of lanes for the road segment, as well as the traveling lane of a particular vehicle and lane width information.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A method comprising:
receiving probe data from radar sensors of vehicles at a road segment, the probe data comprising an identification of static objects and dynamic objects in proximity to the respective vehicles at the road segment, and geographic locations of the static objects and the dynamic objects;
determining, using a processor, a common reference point at the road segment among the identified static objects received from the vehicles;

calculating lateral distances between the identified dynamic objects and the common reference point using the geographic locations of the identified dynamic objects and the common reference point, each lateral distance measured along an axis laterally perpendicular to lanes of the road segment;

ascertaining a number of lanes at the road segment from a distribution of the calculated distances of the identified dynamic objects from the common reference point, wherein the distribution of the calculated distances of the identified dynamic objects is arranged in a histogram, and the number of lanes at the road segment are ascertained based on a number of peaks in the histogram; and updating a map database with the ascertained number of lanes at the road segment.

2. The method of claim 1, further comprising:
defining each lane of the ascertained number of lanes at the road segment with a respective lane number; and
identifying the lane number of a vehicle based on a shortest lateral distance of the vehicle to a location represented by a peak in the histogram.

3. The method of claim 1, further comprising:
verifying the number of lanes at the road segment using ground truth data.

4. The method of claim 1, wherein the common reference point is a position at a road boundary.

5. The method of claim 1, wherein the dynamic objects identified are traveling in a same direction as the respective vehicles.

6. An apparatus comprising:
at least one processor; and
at least one memory including computer program code for one or more programs; the at least one memory and the computer program code configured to, with the at least one processor, cause the apparatus to:
receive probe data from radar sensors of vehicles at a road segment, the probe data comprising an identification of static objects and dynamic objects in proximity to the respective vehicles at the road segment, and geographic locations of the static objects and the dynamic objects;
determine a common reference point at the road segment among the static objects received from the vehicles;
calculate lateral distances of the identified dynamic objects from the common reference point using the geographic locations of the identified dynamic objects and the common reference point, each lateral distance measured along an axis laterally perpendicular to lanes of the road segment;
ascertain a number of lanes at the road segment from a distribution of the calculated distances of the identified dynamic objects from the common reference point, wherein the distribution of the calculated distances of the identified dynamic objects is arranged in a histogram, and the number of lanes at the road segment are ascertained based on the number of peaks in the histogram; and
update a map database with the ascertained number of lanes at the road segment.

7. The apparatus of claim 6, wherein the common reference point is a position at a road boundary.

8. The apparatus of claim 6, wherein the at least one memory and the computer program code are configured to further cause the apparatus to:
define each lane of the ascertained number of lanes at the road segment with a respective lane number; and
identify the lane number of a vehicle based on a shortest distance of the vehicle to a location represented by a peak in the histogram.

9. A method comprising:
receiving probe data from radar sensors of vehicles at a road segment, the probe data comprising an identification of static objects and dynamic objects in proximity to the respective vehicles at the road segment, and geographic locations of the static objects and the dynamic objects;
determining, using a processor, a common reference point at the road segment among the identified static objects received from the vehicles;
calculating lateral distances between the identified dynamic objects and the common reference point using the geographic locations of the identified dynamic objects and the common reference point, each lateral distance measured along an axis laterally perpendicular to lanes of the road segment;
ascertaining a number of lanes at the road segment from a distribution of the calculated distances of the identified dynamic objects from the common reference point, wherein the distribution of the calculated distances of the identified dynamic objects is arranged in a histogram, and the number of lanes at the road segment are ascertained based on a number of peaks in the histogram; and
reporting the ascertained number of lanes at the road segment to a vehicle navigation device over a connected network.

10. The method of claim 9, further comprising:
defining each lane of the ascertained number of lanes at the road segment with a respective lane number; and
identifying the lane number of a vehicle based on a shortest lateral distance of the vehicle to a location represented by a peak in the histogram.

11. The method of claim 9, further comprising:
verifying the number of lanes at the road segment using ground truth data.

12. The method of claim 9, wherein the common reference point is a position at a road boundary.

13. The method of claim 9, wherein the dynamic objects identified are traveling in a same direction as the respective vehicles.

14. An apparatus comprising:
at least one processor; and
at least one memory including computer program code for one or more programs; the at least one memory and the computer program code configured to, with the at least one processor, cause the apparatus to:
receive probe data from radar sensors of vehicles at a road segment, the probe data comprising an identification of static objects and dynamic objects in proximity to the respective vehicles at the road segment, and geographic locations of the static objects and the dynamic objects;
determine a common reference point at the road segment among the static objects received from the vehicles;
calculate lateral distances of the identified dynamic objects from the common reference point using the geographic locations of the identified dynamic objects and the common reference point, each lateral distance measured along an axis laterally perpendicular to lanes of the road segment;
ascertain a number of lanes at the road segment from a distribution of the calculated distances of the identified dynamic objects from the common reference point, wherein the distribution of the calculated distances of the identified dynamic objects is arranged in a histogram, and the number of lanes at the road segment are ascertained based on the number of peaks in the histogram; and report the ascertained number of lanes at the road segment to a vehicle navigation device over a connected network.

15. The apparatus of claim 14, wherein the common reference point is a position at a road boundary.

16. The apparatus of claim 14, wherein the at least one memory and the computer program code are configured to further cause the apparatus to:

define each lane of the ascertained number of lanes at the road segment with a respective lane number; and identify the lane number of a vehicle based on a shortest distance of the vehicle to a location represented by a peak in the histogram.

\* \* \* \* \*